(12) United States Patent
Rostagni et al.

(10) Patent No.: US 11,030,060 B2
(45) Date of Patent: Jun. 8, 2021

(54) DATA VALIDATION DURING DATA RECOVERY IN A LOG-STRUCTURED ARRAY STORAGE SYSTEM

(71) Applicant: INTERNATIONAL BUSINESS MACHINES CORPORATION, Armonk, NY (US)

(72) Inventors: Florent Rostagni, Eastleigh (GB); Leonor Maria Quintais, Eastleigh (GB); Ben Sasson, North Baddesley (GB); Carlos F. Fuente, Bishops Waltham (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/548,474

(22) Filed: Aug. 22, 2019

(65) Prior Publication Data
US 2021/0056000 A1    Feb. 25, 2021

(51) Int. Cl.
*G06F 11/14*    (2006.01)
*G06F 11/07*    (2006.01)
(Continued)

(52) U.S. Cl.
CPC ........ *G06F 11/1469* (2013.01); *G06F 3/0619* (2013.01); *G06F 3/0638* (2013.01);
(Continued)

(58) Field of Classification Search
CPC ............. G06F 11/1469; G06F 16/9027; G06F 3/0619; G06F 3/0638; G06F 3/0673; G06F 11/0793; G06F 12/06; G06F 2212/7201
See application file for complete search history.

(56) References Cited

U.S. PATENT DOCUMENTS 5,488,701 A    1/1996    Brady
6,052,799 A    4/2000    Li
(Continued)

OTHER PUBLICATIONS

Hoakley, "After the crash: replaying the journal to prevent disk errors", The Eclectic Light Company, Jul. 4, 2016, [accessed on Aug. 5, 2019], 8 pages, Retrieved from the Internet: <https://eclecticlight.co/2016/07/04/after-the-crash-replaying-the-journal-to-prevent-disk-errors/>.

(Continued)

*Primary Examiner* — Sean D Rossiter
(74) *Attorney, Agent, or Firm* — Steven M. Bouknight

(57) ABSTRACT

Method and system are provided for data validation during data recovery in a log-structure array (LSA) storage system. The method includes reading a log record of a recovery log for a logical address to obtain a physical address at a storage backend for the data at the time of the log record; reading reference metadata at the obtained physical address, wherein the reference metadata indicates the logical address that last wrote data to the physical address; validating that the physical address for the log record contains valid data for the logical address of the log record by comparing the logical address of the reference metadata to the logical address of the log record; and replaying the log record if the physical address is validated for recovery of virtual domain logical metadata mapping the logical address to the physical addresses of the log record.

20 Claims, 11 Drawing Sheets

(51) Int. Cl.
*G06F 12/06* (2006.01)
*G06F 3/06* (2006.01)
*G06F 16/901* (2019.01)

(52) U.S. Cl.
CPC ........ *G06F 3/0673* (2013.01); *G06F 11/0793* (2013.01); *G06F 12/06* (2013.01); *G06F 16/9027* (2019.01); *G06F 2212/7201* (2013.01)

(56) References Cited

U.S. PATENT DOCUMENTS

| | | | | |
|---|---|---|---|---|
| 9,946,607 | B2 | 4/2018 | Sundararaman | |
| 10,133,663 | B2 | 11/2018 | Atkisson | |
| 2013/0275656 | A1* | 10/2013 | Talagala | G06F 12/0246 711/103 |
| 2014/0325115 | A1* | 10/2014 | Ramsundar | G06F 12/0238 711/102 |
| 2017/0212902 | A1* | 7/2017 | Graefe | G06F 11/1471 |
| 2018/0253369 | A1 | 9/2018 | O'Dowd | |
| 2019/0188091 | A1* | 6/2019 | Christiansen | G06F 16/11 |

OTHER PUBLICATIONS

Ioannou, et al., "Elevating Commodity Storage with the SALSA Host Translation Layer", IBM Research, Jan. 10, 2019, 17 pages, Zurich, CH.

Mell et al., "The NIST Definition of Cloud Computing", National Institute of Standards and Technology, Special Publication 800-145, Sep. 2011, pp. 1-7.

ostep.org, "Log-structured File Systems", Arpaci-Dusseau, 2008-19, 16 pages, Version 1.01, Retrieved from the Internet: <pages.cs.wisc.edu/~remzi/OSTEP/file-lfs.pdf>.

Rosenblum, "The Design and Implementation of a Log-structured File System", 1992, 100 pages, Retrieved from he Internet: <www.eecs.berkeley.edu/Pubs/TechRpts/1992/CSD-92-696.pdf>.

Sovani, "The Linux Journaling Block Device", The Linx Journaling Block Device, Jan. 20, 2006, [accessed on Aug. 5, 2019], 9 pages, Retrieved from the Internet: <http://kedar.dumpstack.com/the-linux-journaling-block-device/ >.

Pending U.S. Appl. No. 16/595,840, entitled "Protecting Against Data Loss During Garbage Collection", filed Oct. 8, 2019, 55 Pages.

* cited by examiner

DATA VALIDATION DURING DATA RECOVERY IN A LOG-STRUCTURED ARRAY STORAGE SYSTEM

BACKGROUND

The present invention relates to log-structured array storage systems, and more specifically, to data validation during data recovery in log-structured array storage systems.

Many storage vendors internally use a log-structure array (LSA) to describe the logical-to-physical layout of block devices in a storage system. LSA are data structures, for example, B-trees, describing the logical-to-physical layout of the data. They are used in storage systems because they offer an easy way to implement many different data reduction techniques, such as thin provisioning, compression, and deduplication. LSAs are agnostic about the type of storage backend.

LSA storage systems use logical block addressing of logical block addresses (LBAs) in a virtual domain to reference physical addresses at a storage backend. The host only needs to provide the LBA without knowing anything of the physical backend.

SUMMARY

According to a first aspect of the present invention there is provided a computer-implemented method for data validation during data recovery in a log-structured array (LSA) storage system, comprising: reading a log record of a recovery log for a logical address to obtain a physical address at a storage backend for data of the logical address at the time of the log record; reading reference metadata at the obtained physical address, wherein the reference metadata indicates the logical address that last wrote data to the physical address; validating that the physical address for the log record contains valid data for the logical address of the log record by comparing the logical address of the reference metadata to the logical address of the log record; and replaying the log record if the physical address is validated for recovery of virtual domain logical metadata mapping the logical address to the physical addresses of the log record.

The method provides the advantage of validating the log records in a recovery log when replaying the recovery log. Checking a reference metadata of the logical address that wrote to a physical address with the log record ensures valid physical addresses are replayed to the logical metadata.

A logical address may include a block of logical addresses. Logical addresses may be grouped in blocks with an arbitrary size and information stored for each block. The recovery log may contain log records for multiple volumes and logical addresses.

The method may include replaying information in the log record that does not relate to the physical address if the physical address is not validated. In this way, other information in the log record may be used even though the physical address is not valid. For example, the other information may include a counter or timestamp that may be updated.

The method may include forward reading a virtual domain logical metadata to determine if the log record is later than a current logical metadata for the logical address, wherein earlier log records are not replayed.

The method may include iterating the method for log records in a recovery log including reading multiple log records for a logical address and wherein replaying all the log records in the recovery log results in recovery of virtual domain logical metadata mapping the logical address to the most recent valid physical address.

The metadata reference at the physical address may be updated during input/output operations of the storage system indicating the logical address that last wrote to the physical address.

The method may include, during a write of data to a logical address: adding reference metadata to host data of the write to indicate the logical address writing the data; writing the data including the reference metadata to a physical address; updating logical metadata of the virtual domain for the logical address with the physical address at which the data is written; and adding a new log record to a recovery log of the updated logical metadata.

The method may include maintaining counters at the logical metadata of the virtual domain and of the log records and may include: comparing a counter of a log record being read with a current counter of the logical metadata for the logical address; replaying log records with a greater counter than the current counter of the logical metadata to update the logical metadata; and updating the counter of the logical metadata even if the replayed log record does not contain a valid physical address for the logical address to indicate that this information is missing. The method may include determining that log records are missing if the log record counter being replayed is a count of one or more greater than the current counter of the logical metadata.

The virtual domain logical metadata may use B-tree data structures to record the mapping of logical addresses to physical addresses and the log records may contain information relating to a copy of a B-tree for restoring the B-tree of the logical metadata. The recovery log is a cyclic log and may indicate where a copy was started in the recovery log for replaying of all the history of the B-tree.

According to another aspect of the present invention there is provided a system for data validation during data recovery in a log-structured array (LSA) storage system, comprising: a processor and a memory configured to provide computer program instructions to the processor to execute the function of the components: a log record reading component for reading a log record of a recovery log for a logical address to obtain a physical address at a storage backend for data of the logical address at the time of the log record; a reference metadata reading component for reading reference metadata at the obtained physical address, wherein the reference metadata indicates the logical address that last wrote data to the physical address; a physical address validating component for validating that the physical address for the log record contains valid data for the logical address of the log record by comparing the logical address of the reference metadata to the logical address of the log record; and a log record replaying component for replaying the log record if the physical address is validated for recovery of virtual domain logical metadata mapping the logical address to the physical addresses of the log record.

The log record replaying component may include an additional information replaying component for replaying information in the log record that does not relate to the physical address if the physical address is not validated.

The system may include a logical metadata reading component for forward reading a virtual domain logical metadata to determine if the log record is later than a current logical metadata for the logical address, wherein earlier log records are not replayed.

The system may include an iterating component for iterating reading of log records in a recovery log including reading multiple log records for a logical address and wherein replaying all the log records in the recovery log results in recovery of virtual domain logical metadata mapping the logical address to the most recent valid physical address.

The system may include a metadata reference component for updating the metadata reference at the physical address during input/output operations of the storage system indicating the logical address that last wrote to the physical address.

The metadata reference component may add reference metadata to host data of the write to indicate the logical address writing the data; and a data write component may write the data including the reference metadata to a physical address; a logical metadata component may update logical metadata of the virtual domain for the logical address with the physical address at which the data is written; and a recovery log component may add a new log record to a recovery log of the updated logical metadata.

The system may include a counting component for maintaining counters at the logical metadata of the virtual domain and a log counting component for maintaining counters of the log records and the log counting component for: comparing a counter of a log record being read with a current counter of the logical metadata for the logical address; replaying log records with a greater counter than the current counter of the logical metadata to update the logical metadata; and updating the counter of the logical metadata even if the replayed log record does not contain a valid physical address for the logical address to indicate that this information is missing.

The system may include a missing record component for determining that log records are missing if the log record counter being replayed is a count of one or more greater than the current counter of the logical metadata.

The virtual domain logical metadata may use B-tree data structures to record the mapping of logical addresses to physical addresses and the log records may contain information relating to copies of a B-tree for restoring the B-tree of the logical metadata. The recovery log may be a cyclic log and may indicate where a copy was started in the recovery log for replaying of all the history of the B-tree.

According to a further aspect of the present invention there is provided computer program product for data validation during data recovery in a log-structured array (LSA) storage system, the computer program product comprising a computer readable storage medium having program instructions embodied therewith, the program instructions executable by a processor to cause the processor to: read a log record of a recovery log for a logical address to obtain a physical address at a storage backend for data of the logical address at the time of the log record; read reference metadata at the obtained physical address, wherein the reference metadata indicates the logical address that last wrote data to the physical address; validate that the physical address for the log record contains valid data for the logical address of the log record by comparing the logical address of the reference metadata to the logical address of the log record; and replay the log record if the physical address is validated for recovery of virtual domain logical metadata mapping the logical address to the physical addresses of the log record.

According to a further aspect of the present invention there is provided a computer-implemented method for data validation during data recovery in a log-structured array (LSA) storage system, comprising: reading log records of a recovery log, each log record being for a logical address and providing a physical address at a storage backend for the data at the time of the log record; and validating that the physical address of a log record contains valid data for the logical address of the log record by reading reference metadata at the physical address in the log record, wherein the reference metadata indicates the logical address that last wrote data to the physical address.

The method may include replaying a log record if the physical address is validated for recovery of virtual domain logical metadata mapping the logical address to the physical addresses of the log record.

According to a further aspect of the present invention there is provided a system for data validation during data recovery in a log-structured array (LSA) storage system, comprising: a processor and a memory configured to provide computer program instructions to the processor to execute the function of the components: a log record reading component for reading log records of a recovery log, each log record being for a logical address and providing a physical address at a storage backend for the data at the time of the log record; and a physical address validating component for validating that the physical address of a log record contains valid data for the logical address of the log record by reading reference metadata at the physical address in the log record, wherein the reference metadata indicates the logical address that last wrote data to the physical address.

The system may include a log record replaying component for replaying the log record if the physical address is validated for recovery of virtual domain logical metadata mapping the logical address to the physical addresses of the log record.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

Figure 1:
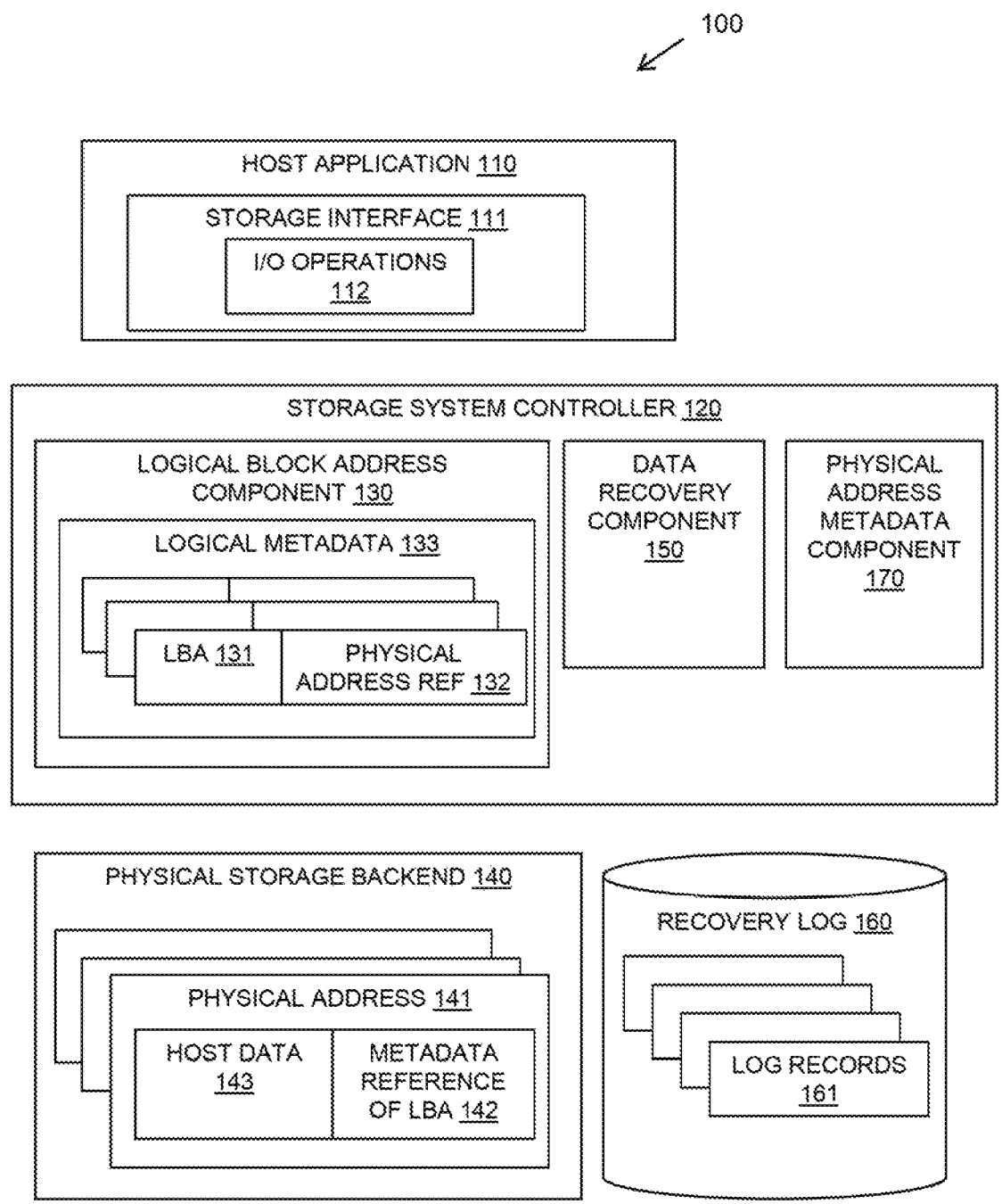
FIG. 1 is a block diagram of an example embodiment of a log-structured array storage system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

As previously described, LSA storage systems may use logical block addressing of logical block addresses (LBAs) in a virtual domain to reference physical addresses at a storage backend. The host only needs to provide the LBA without knowing anything of the physical backend. Although this approach may have many advantages, it causes repeat writes to a same LBA to move across the physical domain at the backend. This is mainly because of compression of the data. For example, data may be written at LBA L that is compressed to size S; LBA L may then be overwritten LBA L with different data with a different compression ratio, leading to new size T>S. This new write would not fit in the backend storage location where the previous one was performed because it would partly or fully overwrite data written for another LBA.

At the physical backend new space is allocated and garbage collected due to the movement of the stored data across the backend. As space is freed and reused, the old locations for a given LBA can be overwritten with data for another LBA.

In an LSA storage system, one way to recover data after corruption consists of journaling in a log the input/outputs' logical-to-physical layout during normal system operation, and then replaying the log during the recovery process. This log is stored at a disk location different from the data, and their destage to the backend are independent.

The problem with this solution is that either part of the data or part of the log might not have been destaged to the backend, and thus replaying the full log may lead to logical domain metadata pointing to an invalid physical location. A physical location may be invalid due to the physical address being overwritten by data for another LBA. A physical location may also be invalid as virtual domain metadata may point to the most recent physical address, but the data may never have reached the backend.

A known strategy for dealing with this problem involves adding a small portion of metadata at the physical address on the backend to be able to identify which LBA of the virtual domain wrote to that physical location. This can be used during normal input/output (I/O) handling to identify any case where the logical-to-physical layout has an issue, and to prevent the return of the wrong data.

A problem arises after a widespread cache data loss event, which leaves the storage system in a state where a large subset of data cannot be returned, particularly the set of data that was being updated most recently. Experience shows that this renders the entire data set unusable, even if the set of changes lost represent <0.1% of the capacity of the storage system.

As such, a method and system are described for providing data validation during data recovery in a log-structure array (LSA) storage system. An LSA storage system provides an array or pool of physical storage devices with a storage controller providing a mapping between logical addresses and the physical storage devices providing storage virtualization at the disk layer. A host server views the storage array as one or more logical devices that provide a representation of the physical storage devices. The logical representation of the storage resources is not constrained by physical limitations and hides the complexity.

The term "log-structured array storage system" is intended to include storage systems that are not fully allocated and use a mapping of logical addresses in the virtual domain to physical addresses on the backend. This excludes storage systems that are fully allocated with a direct mapping between logical addresses in the virtual domain and physical addresses on the backend.

The storage controller may be a software-enabled storage virtualization engine that may be accessible to host computers locally or remotely as a cloud service. The storage controller is provided on multiple computer servers that may be provisioned in the cloud and these are referred to as nodes. Each node may provide virtualization for a set of volumes, cache and copy service functions and may be deployed in pairs to provide fallback and grouped as a clustered system. Each pair of nodes may be referred to as an I/O group. A specific volume is presented to a host server by a single I/O group of the storage system.

Host servers see logical disks that are referred to as virtual disks or volumes, which are presented by the I/O groups through a network. Each volume has logical block addresses (LBAs) that may be grouped into blocks or chunks to which host data is written.

Referring to FIG. 1, an example embodiment of a generalized overview of an LSA storage system 100 is shown. The LSA storage system 100 provides storage for a host application 110 at a host server having a storage interface 111 through which input and output operations 112 are handled for writing and reading data to and from the storage system 100. The physical storage backend 140 provides physical disk storage across an array of physical devices of non-volatile storage media. The physical storage backend 140 has physical addresses 141 at which logical units of data are stored and referenced by the LBAs 131.

In an LSA storage system 100, a storage system controller 120 provides a logical block address component 130 for maintaining a virtual domain in which logical metadata 133 is maintained of logical block addresses (LBAs) 131 which are mapped to references 132 of physical addresses at which the data is stored at a physical storage backend 140. Throughout this description, LBAs are referred to and should be understood to include blocks or chunks of LBAs as information is not stored for every LBA, instead LBAs are grouped at an arbitrary size.

In LSA storage systems 100, each write to the same LBA 131 in the virtual domain may be performed at different physical addresses 141 on the backend. As garbage collection is carried out at the physical storage backend 140, physical addresses 141 are reused for more recent writes by other LBAs.

The storage system controller 120 includes a data recovery component 150 for use in the event of a failure in the storage system 100. The data recovery component 150 uses a recovery log 160 that provides log records 161 referencing the physical addresses to which the LBA has been mapped over the time recorded by the log. There may be only one recovery log 160 for the storage system 100 with all LBAs for all volumes in it.

The physical storage backend 140 has a metadata reference 142 that is appended (at the front or end) of the host data 143 at the physical addresses 141; the metadata reference 142 indicates the LBA whose data is stored at the physical address 141 at a current time. In other words, the last LBA to write host data 143 to the physical address 141. In conventional LSA storage systems 100, the storage system controller 120 may include a physical address metadata component 170 for using this metadata reference 142 during input/output operations 112 to ensure a physical location 151 is valid for an LBA 131.

The data recovery component 150 may be used to recover from a wide-spread cache data loss event in which a large subset of data cannot be returned. The data recovery component 150 of the described system may use the metadata reference 142 at the physical address 141 during data recovery to validate the log records of the recovery log 160 as described further below.

A method of improving the chances of recovery for any specific LBA 131 is described that is useful when a last generation of the data is lost as part of the event that led to the recovery. The method addresses missing data pointed to by the recovery log 160 and includes the possibility of returning an older version of the host data that in most cases could still be valuable to the host application 110.

The described method is carried out whilst the data recovery component 150 is performing a replay of a log record 161 log for recovery of data for a logical address 131 from a physical storage backend 140.

The method reads each log record 161 of the recovery log 160 for volumes and LBAs to obtain the physical address 141 at the physical storage backend 140 for the log record and validates that the physical address 141 contains valid data for the LBA. This validation is carried out by reading the metadata reference 142 at the physical address 141 indicating the LBA that last wrote to the physical address 141.

The metadata reference 142 may be available for the physical address 141 as it may be used during input and output operation 112 to record the LBA whose data is currently written to the physical address 141. In the described method, this metadata reference 142 is used during the recovery log 160 replay to validate the log records 161 for an LBA. The content of the host data at the physical address is validated for each log record 161 in the recovery log 160 before replaying it during recovery of data from corruption in the LSA storage system 100.

The method may add some extra steps while replaying the recovery log 160 so that if the backend data is missing it is possible in some cases to retain an older, still valid pointer. The advantage of this method is that it improves the chances of the host application 110 of recovering from a disaster. The method uses the properties of the LSA storage system 100 that make it sensitive to this type of data loss and turn them into a mechanism that helps to recover from it.

In one embodiment, the logical metadata 133 is provided as B-tree data structures, with a B-tree provided for each volume. A B-tree structure provides a self-balancing tree data structure that maintains stored data and allows searches, insertions and deletions in logarithmic time. B-tree structures are well suited for storage systems that read and write large blocks of data.

The B-tree data structures are used for the forward lookup of the logical metadata 133, i.e. to get the physical address on the backend of an LBA in the virtual domain. The question of where data for volume V, LBA L has been written is answered by doing a forward lookup by reading these B-tree data structures. In general, this is done on a certain granularity: the information is not stored for every LBA, the LBAs are grouped in "chunks" and their size is arbitrary, for example, 8K can be chosen. Within the storage system 100, such B-tree data structures can be stored in virtual disks hidden from the host application 110.

When host data is written on a different location on the backend the B-tree gathers the data for many physical disks (in general all the physical disks in the same storage pool in the same I/O group). When a write is performed, the B-tree data structure is updated after the data has been written to the physical disk.

Figure 2A:
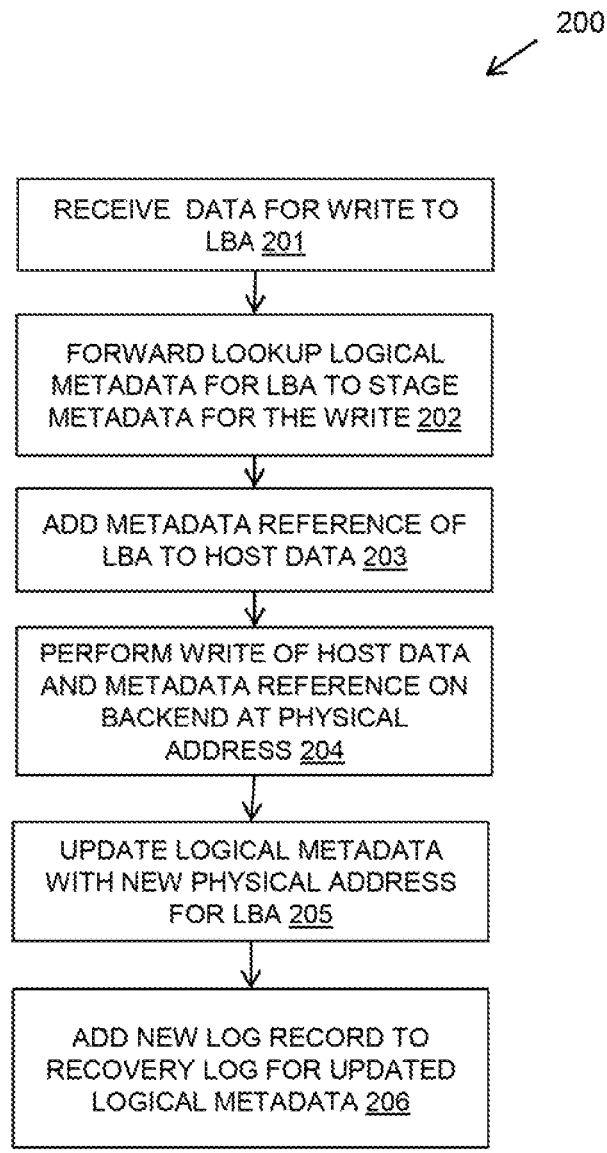
FIGS. 2A, 2B and 2C are flow diagrams of example embodiments of aspects of methods in accordance with the present invention.

Referring to FIG. 2A, a flow diagram 200 shows an example embodiment of an aspect of the described method during a data write at a storage system controller 120 of an LSA storage system 100.

The method may receive 201 data for writing to an LBA from a host application. The LBA may be written as a block or chunk. A forward lookup of the logical metadata is carried out 202 for the LBA to stage the logical metadata for LBA chunk.

A metadata reference of the LBA writing the data is added 203 to the host data to be written and the write of the host data together with the appended metadata reference is performed 204 at the backend physical address. The logical metadata is updated 205 with the new physical address for the LBA.

A new log record is added 206 to the recovery log for the updated logical metadata.

In an embodiment in which the logical metadata is provided as a B-tree data structure, a forward lookup in the B-tree is performed to stage the metadata of an LBA chunk. The B-tree is updated once the write is made to the new physical address so that subsequent reads will read the most recent data and not an old version.

After the B-tree is updated, the information required to replay this update is stored in the recovery log. The recovery log can be used to store B-tree updates for all the volumes in the storage pool.

The records in the recovery log contain information for each update of each chunk in all the volumes. As the B-trees are stored on disks on a different hidden volume, this volume can be used to store copies of the B-trees and restore from them before restoring from the recovery log.

The log records are pieces of information that contain the minimum amount of information to recover the B-tree after it has been recovered by the copy.

Figure 2B:
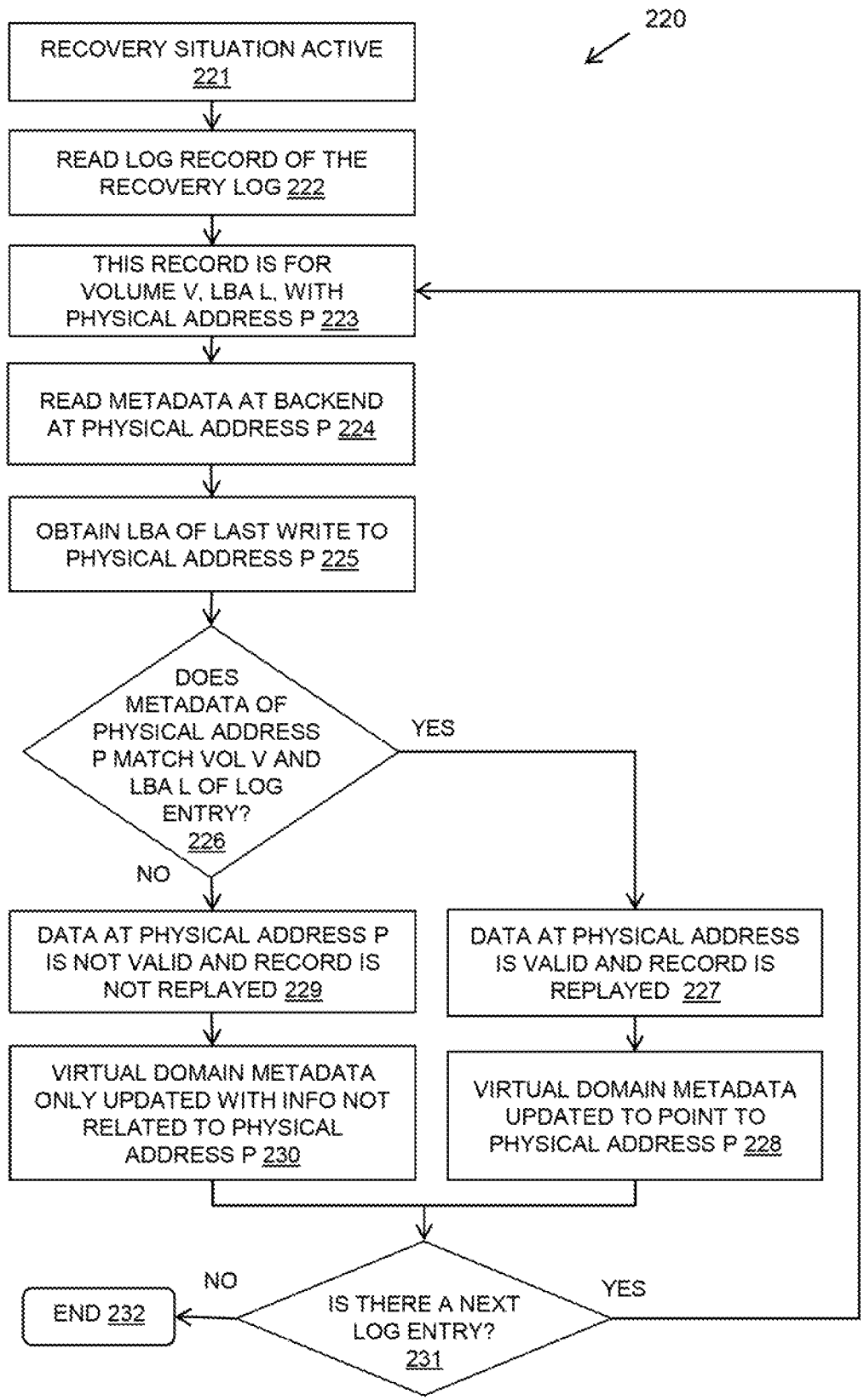

Referring to FIG. 2B, a flow diagram 220 shows an example embodiment of an aspect of the described method carried out by a data recovery component 150 of an LSA storage system 100.

The method takes place when a recovery situation is active 221 by replaying a recovery log to recover data by referencing the logical metadata log records and mapping LBAs to the physical addresses at which the data was written over time.

In general, there is only one log per system, with all LBAs for all volumes in it. When replaying the log, a recovery method starts by reading 222 a first record which indicates which volume and LBA this record is for as well as the new physical address on the backend. So, a record may be 223 for Volume V, LBA L with physical address P.

The metadata reference at the obtained physical address P is read 224 to obtain 225 the LBA recorded in the metadata reference of the physical address. The recorded LBA is the LBA whose data is stored at the physical address.

It is determined 226 if the recorded LBA of the metadata reference for the physical address matches the LBA of the log record.

If the LBA matches, then the data at the physical address at the backend is valid for that LBA of the virtual domain and the update is replayed 227. The virtual domain logical metadata is updated 228 for the LBA L of Volume V to point to the physical address P on the backend.

If it is determined 226 that the recorded LBA of the metadata reference for the physical address does not match the LBA of the log record, then the data at the physical address P at the backend is not valid for that LBA L of Volume V of the virtual domain and the update is not replayed 229.

Other information contained in the log record for the LBA not related to the physical address may be used to update 230 the virtual domain logical metadata. For example, the information may include a counter of the number of times this LBA was overwritten. This may acknowledge that there had been a record that was attempted to be replayed but for which the physical address was not changed. This can be for many reasons including, for example, making sure there are no gaps in the log by comparing the counter being replayed versus the counter stored in the current version of the logical metadata.

Another piece of information contained in the log record may be a timestamp to indicated when the data had been updated. This timestamp could also be updated in the replay of the log record.

Once a log record is completed, the method then determines 231 if there is a next log record and the next one is read, which might be for a different volume and/or LBA. If so, the method loops to process the next log record. With iterations of the method through the log records of the recovery log, multiple log records for a specific LBA of a volume may be processed interleaved with other LBAs of other volumes. The recovery completes 232 when the full recovery log has been read and replayed.

In this way, the described method validates the content of the data present at the physical address on the backend for each log record before replaying the log record and updating the virtual domain logical metadata. This means that the recovery process performs a read on the backend to check if the data corresponds to data of that LBA of the virtual domain. This check uses the presence of the metadata reference at the physical address on the backend to be able to identify which LBA of the virtual domain wrote to that physical location.

If a log record is found to be invalid, an earlier valid log record for the LBA may have already been replayed returning an older version of the data, which may be useful.

Figure 2C:
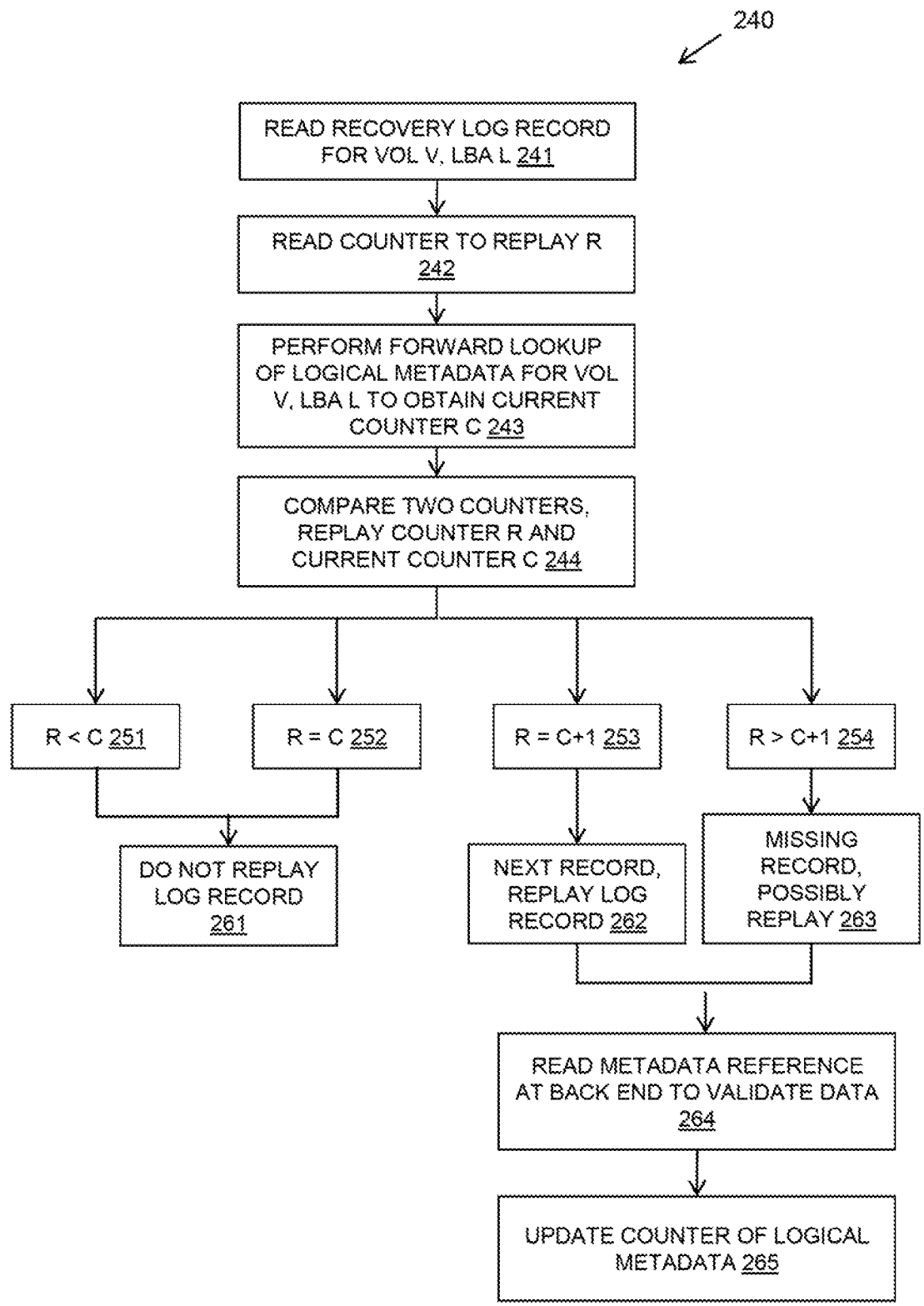

Referring to FIG. 2C, a flow diagram 240 shows an example embodiment of another aspect of the described method carried out by a data recovery component 150 of an LSA storage system 100 using counters for the replay of log records.

A log record of the recovery log may be read 241 and may read a record for volume V, LBA L: this log record may include 242 a counter to replay, called R (for replay).

A forward lookup is performed 243 of volume V, LBA L of the virtual domain logical metadata, which provides the current counter for this LBA, called C (for current).

The two counters are compared 244, the replay counter R of the log record and the current counter C at the logical metadata:

If R<C 251, then this is an older log record, and the log record is not replayed 261 it because there is no point going backward;

If R=C 252, then there is no point in trying to replay this record as it is already in the logical metadata and the log record is not replayed 261;

If R=C+1 253, then this is the next log record and the log record is replayed 262;

If R>C+1 254 then there is one or more missing log record 263. This can be serious as it might indicate backend issues, or other problems that have to be dealt with. This may be handled by replaying the log record as is, or by taking other actions.

If it is decided to replay the log record with counter C, then the read of the backend metadata reference is carried out 264 to see if the data for the LBA is still present or not and then it is decided if this record is replayed or not.

However, given that not replaying a particular log record is different from having a gap, the solution must understand that not replaying a record is because this was decided, thus instead of just ignoring this log record if it is invalid, the counter in the logical metadata is updated 265.

Figure 3:
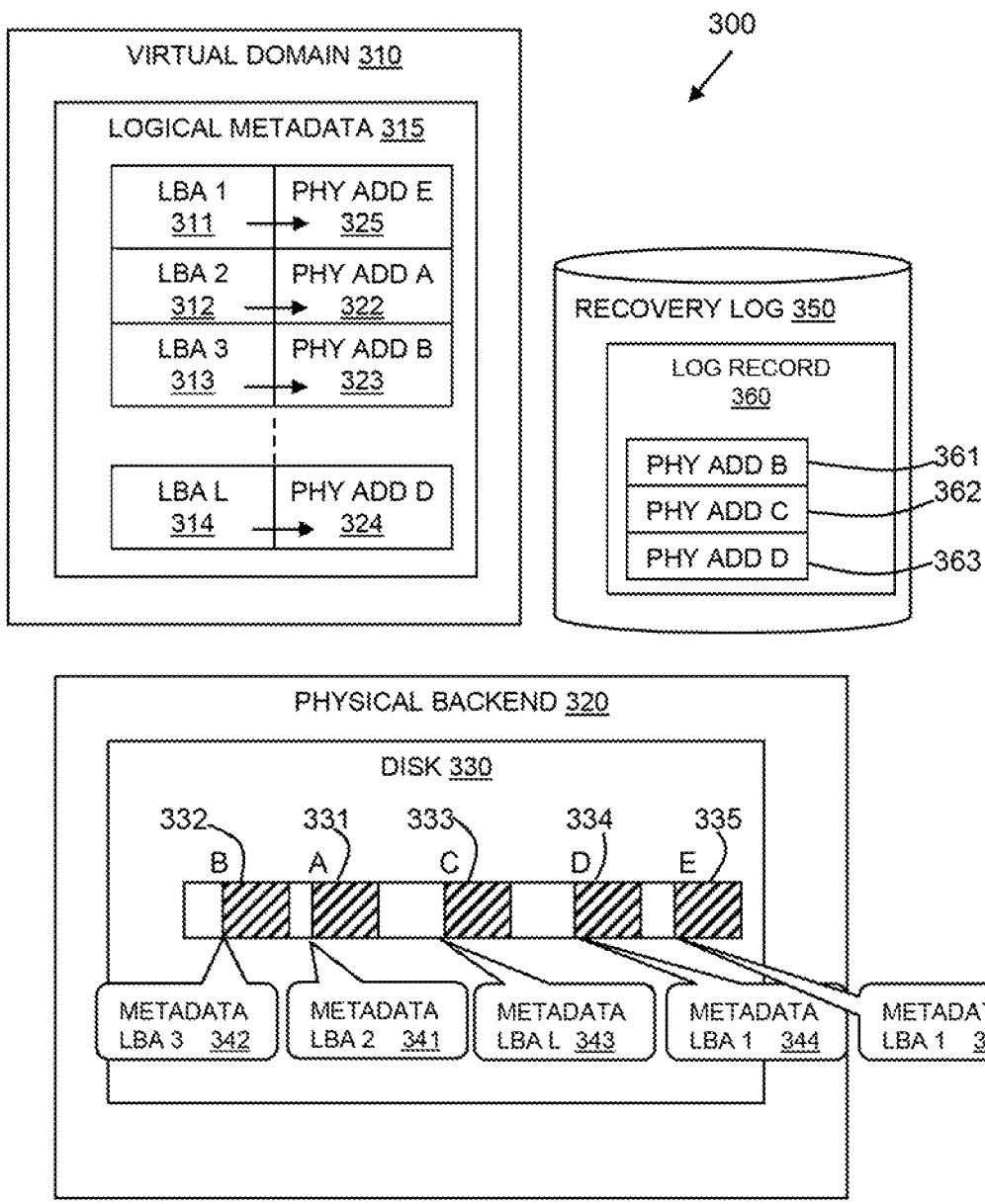
FIG. 3 is a schematic diagram of an example embodiment of virtual domain to physical backend mapping in accordance with the present invention.

Referring to FIG. 3, a schematic diagram 300 illustrates an example embodiment of the described data structures in an LSA storage system.

A virtual domain 310 includes logical metadata 315 that for each LBA 311-314 points to a physical address 322-325 on the physical backend 320 that currently stores the data for the LBA 311-314. In this worked example, LBA L 314 has data currently indicated as stored at physical address D.

A physical backend 320 includes multiple storage disks 330 each with multiple physical addresses as shown by physical addresses A 331, B 332, C 333, D 334 and E 335. The physical backend 320 includes a metadata reference 341-345 at each physical address 331-334 recording the LBA 311-314 that has currently written data at the physical address 331-334.

A recovery log 350 stores log records 360 of the logical metadata 315 of one or more volumes in the storage system. The log records 360 may include multiple log records 361-363 for the history of physical addresses at which a specific LBA's data has been written, which may be interleaved with log records of other LBAs. In this example, the log records 360 are shown for LBA L 314 and show log records of physical address B 361, physical address C 362, and physical address D 363, where physical address D is the current address.

However, the write of LBA L to physical address D 334 may have failed in the course of an event that requires the recovery process described further below or LBA L may have been overwritten and the physical address D recycled by garbage collection and written to by another LBA. Therefore, the reference metadata 344 at physical address D 334 may refer to a different LBA, say LBA 1 as shown.

An example embodiment of a log record 360 in the recovery log 350 has the following information:

Virtual address: the LBA of the host I/O;
Volume ID;
Serial number, which is a counter of the number of times this LBA has been overwritten;
The type of record depending on the type of update being recorded (it can be a full write or an unmap for reclaiming space);
Timestamp, such as a number of milliseconds since the creation of the cluster;
And then different data depending on the record type;
Nothing more for unmaps;
Physical address and size of the data on the data disk for full writes and other metadata present due to the underlying metadata layout in the metadata disk (compression would make the size change for example).

A recovery log may take various known forms and may have a finite size in order to prevent the usage of too much storage to store the recovery log itself as well as to avoid taking too long a time to replay the log. This can be achieved by different means.

A possible solution consists of having a finite size recovery log that is cyclic. The challenge is how to fit the relevant information for an undetermined amount of time without any prior knowledge.

An example of a recovery log in an embodiment using B-tree data structures for the virtual domain logical metadata consists of providing information to recover B-trees after they have been recovered from their saved copies. Copies of B-trees are taken, and it is remembered when each copy was started.

When a copy is started, the position is remembered that will write next in the recovery log. In addition, it is known that the copy of that B-tree will have all the history of the B-tree until the last written record. This means that by restoring the B-tree from the copy and then replaying the recovery log from the remembered position ensures that all the history of the B-tree will be replayed.

If there are many volumes, thus many B-trees, this position is remembered for all the B-trees and more particularly the oldest position remembered, so that if the recovery log is replayed from that oldest position, it will replay all the missing history for all the B-trees.

This also means that for some B-trees, records may be replayed that are already recovered by the copy or from even before what was in the copy. This can be detected by storing a counter both in the B-tree and in the recovery log. During normal I/Os every time an LBA chunk is updated, this counter is incremented. Then when replaying the log, the counter in the log is compared to the counter in the B-tree and if the counter from the log is smaller than or equal to the counter from the B-tree, then the record is not replayed.

Referring to FIGS. 4A to 4D, schematic diagrams 410, 420, 430, 440 show a chronological sequence of recovery using the data structures of FIG. 3. FIGS. 4A to 4D show the log records 360 for that will be replayed for LBA L 314 of the virtual domain 310 and the physical backend physical addresses 331 to 334 to which the log records 361-363 point.

Replaying log records may actually be interleaved with replaying log records for other volumes and LBAs, and this example only represent log records for this LBA in order, regardless of where they are situated in the recovery log.

Figure 4A:
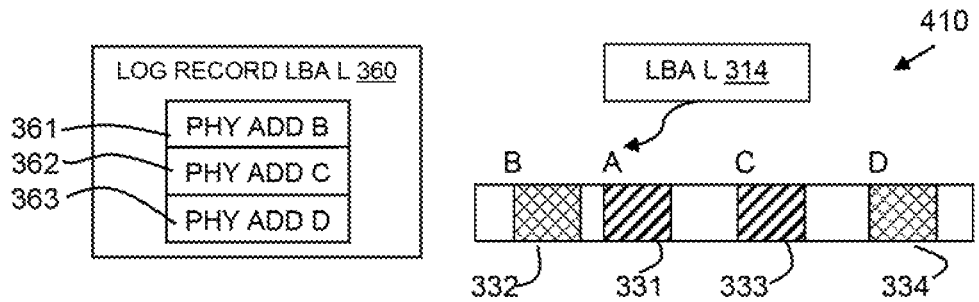
FIGS. 4A to 4D are schematic diagrams of a series of stages of an example embodiment of a method in accordance with the present invention.

Referring to FIG. 4A, the metadata for LBA L 314 of the virtual domain is first pointing to physical address A 331 on the backend as an initial state. There are three log records 361-362 of the LBA L 314 to be replayed, pointing to physical addresses B 361, C 362, and D 363 on the backend. Physical addresses B 362 and D 363 do not contain valid data for LBA L 314 of the virtual domain and this is represented by the cross-hatching of their boxes. Physical addresses A 331 and C 333 contain valid data for LBA L 314 of the virtual domain and this is represented by the diagonal-hatching of their boxes.

Figure 4B:
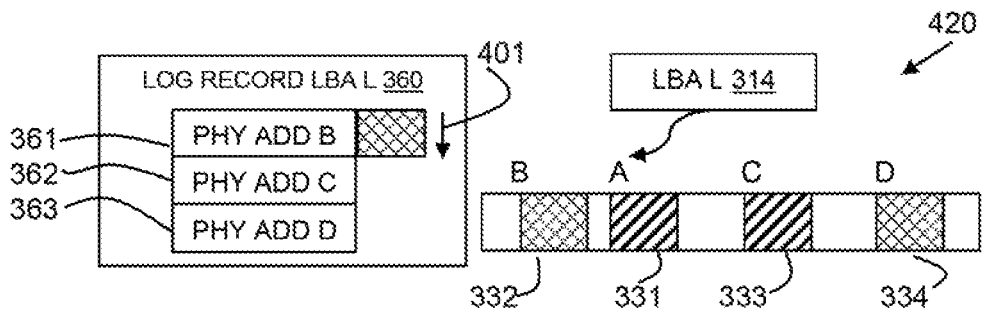

Referring to FIG. 4B, the log records 360 are read as shown by arrow 401 replaying the first log record entry 361. The first record entry 361 points to physical address B 332 that no longer contains valid data for LBA L 314. The data is established as invalid by checking the metadata record 342 that shows a different LBA, LBA 3 313, last wrote to physical address B 332 and not LBA L 314. Therefore, physical address B 332 does not contain valid data for LBA L 314. Therefore, the logical metadata for LBA L 314 in the virtual domain remains pointing to physical address A 331.

Figure 4C:
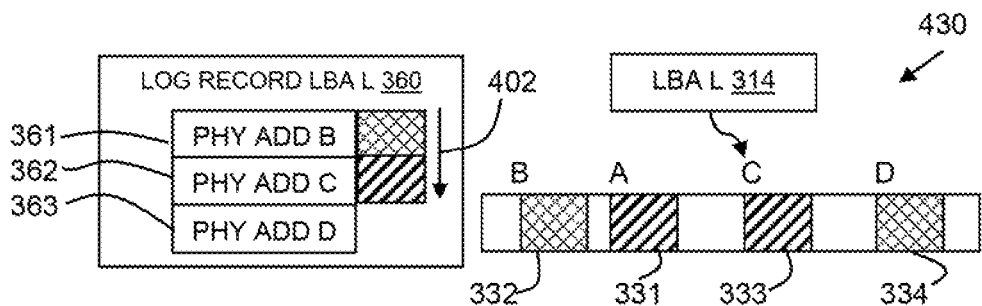

Referring to FIG. 4C, the log records 360 are read as shown by arrow 402 replaying the second record entry 362. The second record entry 362 points to physical address C 333 that does contain valid data for LBA L 314. The data is established as valid by checking the metadata record 343 that shows LBA L 314 last wrote to physical address C 333 and therefore physical address C 333 contains valid data for LBA L 314. Therefore, the logical metadata for LBA L 314 in the virtual domain now points to physical address C 333.

Figure 4D:
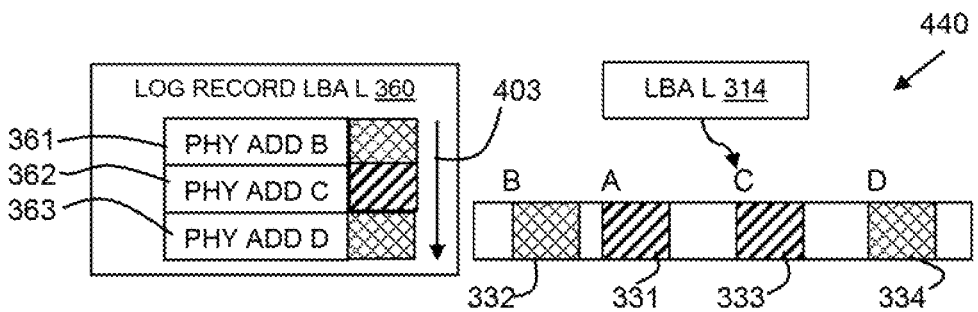

Referring to FIG. 4D, the log records 360 are read as shown by arrow 403 replaying the third record entry 363. The third record entry 363 points to physical address D 334 that no longer contains valid data for LBA L 314. The data is established as invalid by checking the metadata record 344 that shows a different LBA, LBA 1 311, last wrote to physical address D 334 and not LBA L 314. Therefore, physical address D 334 does not contain valid data for LBA L 314. Therefore, the logical metadata for LBA L 314 in the virtual domain remains pointing to physical address C 333 that contains valid data, but potentially an old version.

Therefore, reads to LBA L 314 of the virtual domain 310 will return the data present at physical address C 333 on the backend, which is either the last version of the data in the case where physical address D was a garbage collection move, or a previous version of the data in the case of physical address D was an overwrite. This results in less holes in the post-recovery data set.

Referring to FIGS. 5A to 5D, schematic diagrams 510, 520, 530, 540 show the same chronological sequence of recovery as FIGS. 4A to 4D but using a method of the prior art that does not check the validity of the backend physical address data whilst replaying the log record 360 for LBA L as shown by arrows 501 to 503.

Figure 5A:
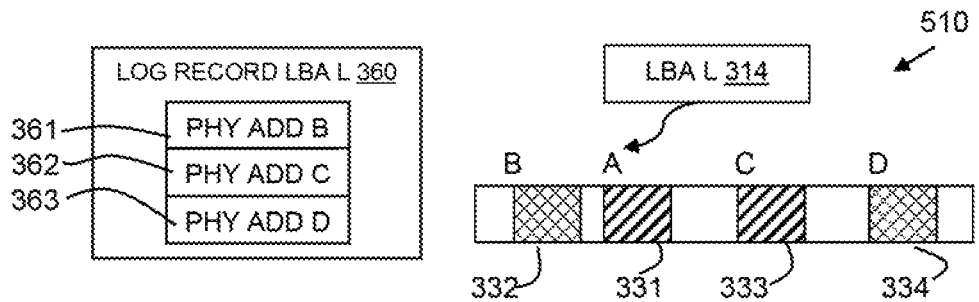
FIGS. 5A to 5D are schematic diagrams of a series of stages of a prior art method for comparison with the series of stages of FIGS. 4A to 4D.
Figure 5B:
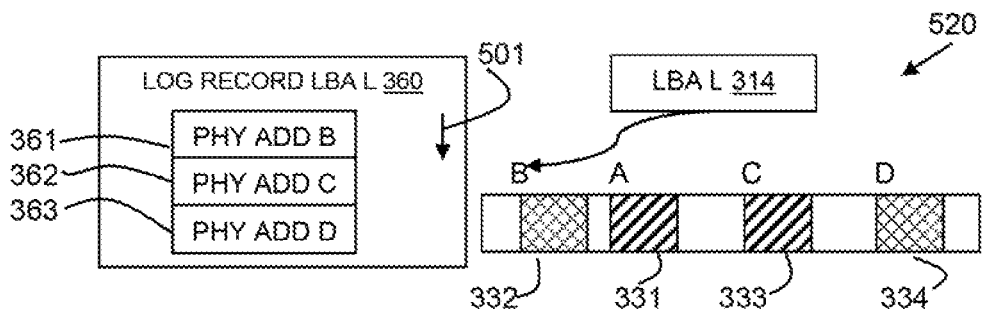

In the prior art recovery process, FIG. 5A shows the metadata for LBA L 314 initially pointing to physical address A 331. FIG. 5B replays 501 log record 361 of physical address B and the metadata for LBA L 314 is updated to point to physical address B 332 even though it does not contain valid data for LBA L 314.

Figure 5C:
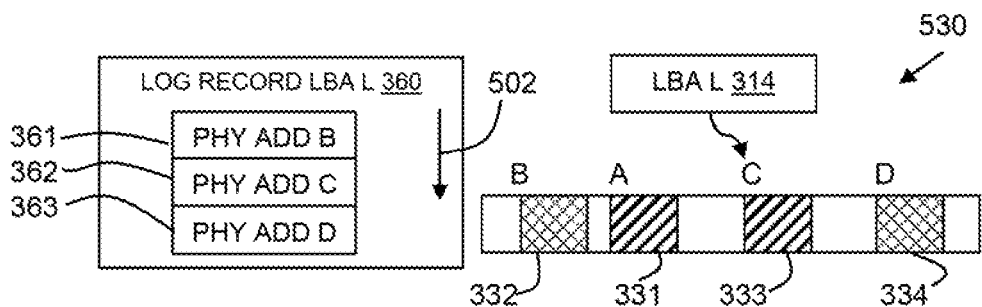

FIG. 5C replays 502 the next log record 362 of physical address C and the metadata for LBA L 314 is updated to point to physical address C 333 that does contain valid data for LBA L 314.

Figure 5D:
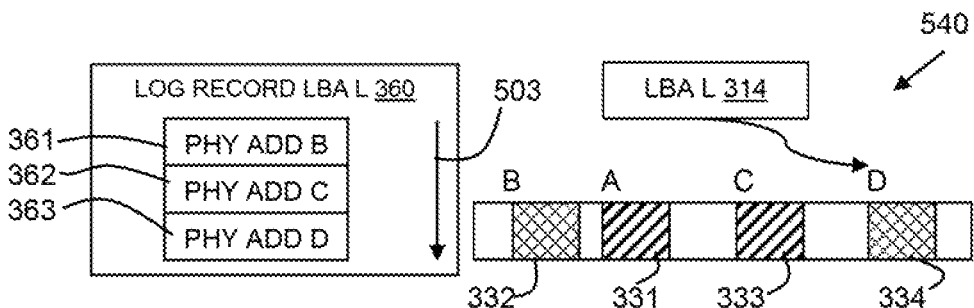

FIG. 5D replays 503 log record 363 of physical address D and the metadata for LBA L 314 is updated to point to physical address D 334 even though it does not contain valid data for LBA L 314. Given that physical address D 334 is the last record for LBA L 314 of the virtual domain, this prior art method will not be able to return valid data for LBA L 314 of the virtual domain, thus this is a data loss.

Figure 6:
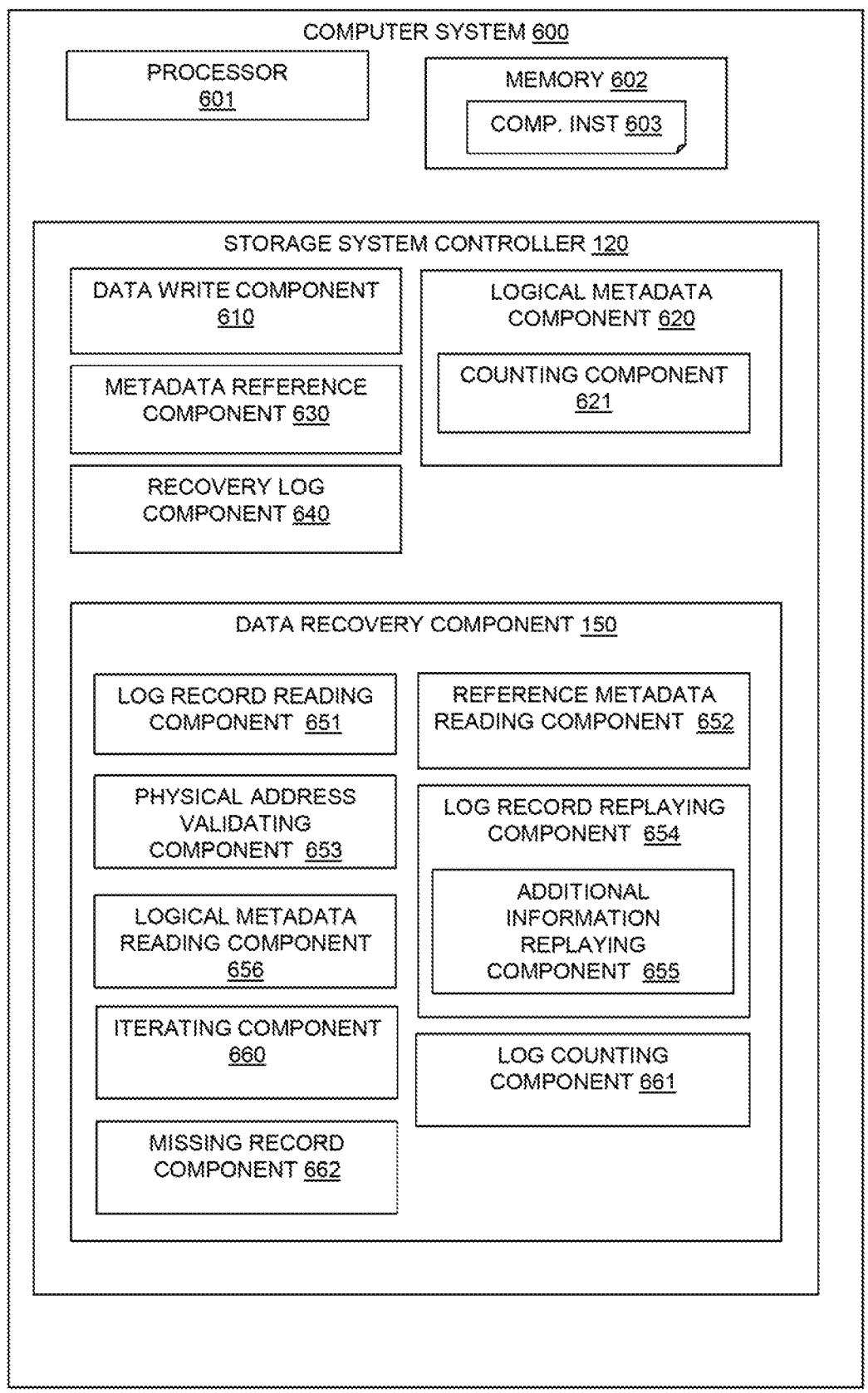
FIG. 6 is block diagram of an example embodiment of a system in accordance with the present invention.

Referring to FIG. 6, a block diagram shows an example embodiment of a computer system 600 providing a storage system controller 120 including a data recovery component 150 including data validation during data recovery in a log-structure array (LSA) storage system 100. The data recovery component 150 may be provided remotely to the storage system controller 120.

The computer system includes at least one processor 601, a hardware module, or a circuit for executing the functions of the described components which may be software units executing on the at least one processor. Multiple processors running parallel processing threads may be provided enabling parallel processing of some or all of the functions of the components. Memory 602 may be configured to provide computer instructions 603 to the at least one processor 601 to carry out the functionality of the components.

The storage system controller 120 may include a data write component 610 for writing data to a physical address in the storage system. The storage system controller 120 may also include a logical metadata component 620 for updating logical metadata of the virtual domain for a logical address with the physical address at which the data is written.

The storage system controller 120 also includes a metadata reference component 630 for updating a metadata reference at the physical address during input/output operations of the storage system indicating the logical address that last wrote to the physical address. The metadata reference component 630 adds reference metadata to host data of a write to indicate the logical address writing the data.

The storage system controller 120 includes a recovery log component 640 for adding a new log record to a recovery log of the updated logical metadata when a data write takes place.

A data recovery component 150 is provided for using a recovery log to which log records of the logical metadata are written for recovery during a failure.

The data recovery component 150 may include a log record reading component 651 for reading a log record of a recovery log for a logical address to obtain a physical address at a storage backend for the data at the time of the log record and a reference metadata reading component 652 for reading reference metadata at the obtained physical address. The reference metadata indicates the logical address that last wrote data to the physical address.

The data recovery component 150 may include a physical address validating component 653 for validating that the physical address for the log record contains valid data for the logical address of the log record by comparing the logical address of the reference metadata to the logical address of the log record.

The data recovery component 150 may include a log record replaying component 654 for replaying the log record if the physical address is validated for recovery of virtual domain logical metadata mapping the logical address to the physical addresses of the log record. The log record replaying component 654 may include an additional information replaying component 655 for replaying information in the log record that does not relate to the physical address if the physical address is not validated.

The data recovery component 150 may include a logical metadata reading component 656 for forward reading a virtual domain logical metadata to determine if the log record is later than a current logical metadata for the logical address, wherein earlier log records are not replayed.

The data recovery component 150 may include an iterating component 660 for iterating reading of log records in a recovery log including reading multiple log records for a logical address and wherein replaying all the log records in the recovery log results in recovery of virtual domain logical metadata mapping the logical address to the most recent valid physical address.

In one embodiment, the logical metadata component 620 may include a counting component 621 for maintaining counters at the logical metadata of the virtual domain and the data recovery component 150 may include a log counting component 661 for reading counters of the log records and comparing a counter of a log record being read with a current counter of the logical metadata for the logical address. The log counting component 661 may include functionality to cooperate with the log record replaying component 654 for replaying log records with a greater counter than the current counter of the logical metadata to update the logical metadata and cooperating with the logical metadata component 620 for updating the counter of the logical metadata even if the replayed log record does not contain a valid physical address for the logical address to indicate that this information is missing.

The data recovery component 150 may include a missing record component 662 for determining that log records are missing if the log record counter being replayed is a count of one or more greater than the current counter of the logical metadata.

Figure 7:
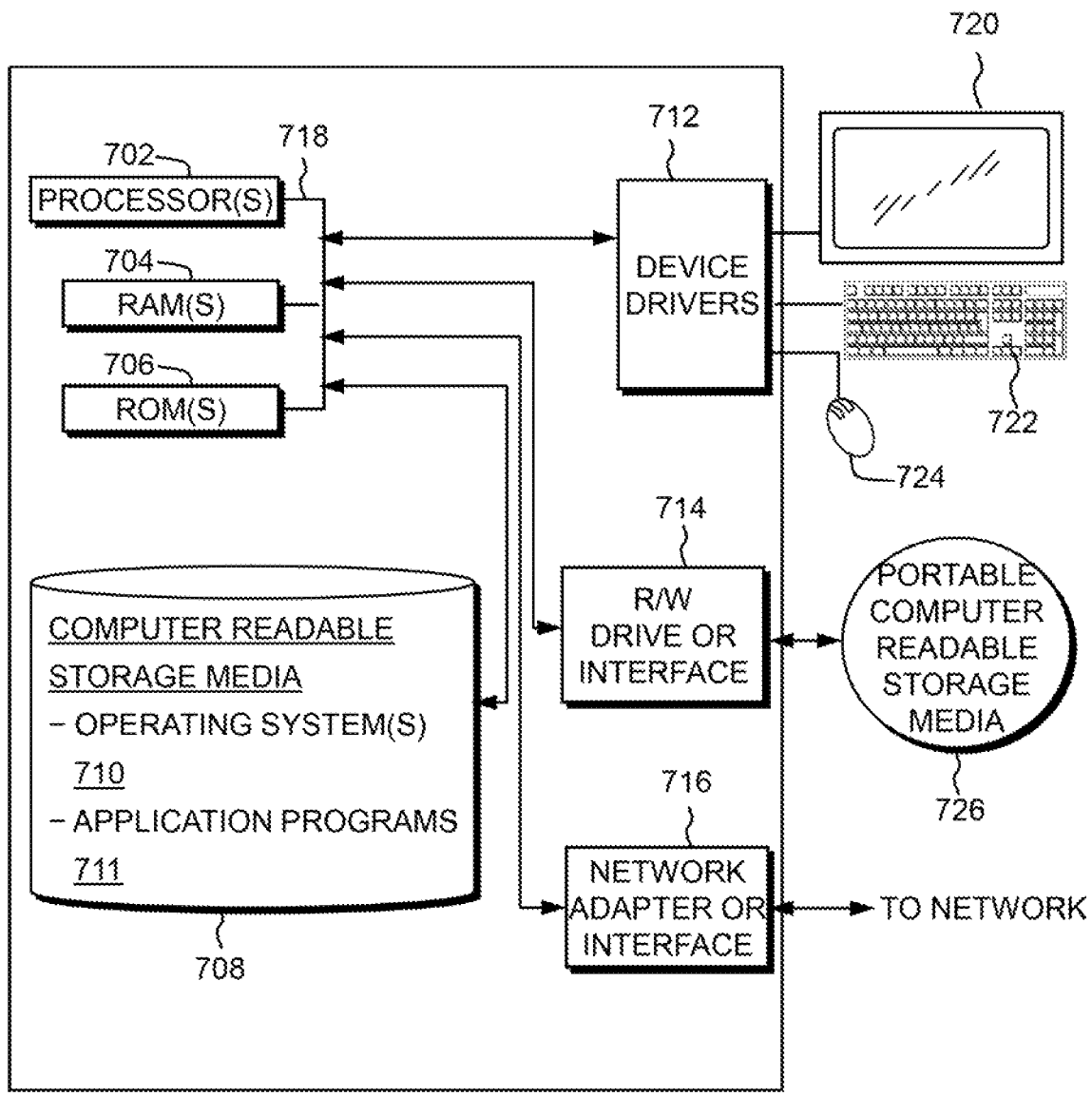
FIG. 7 is a block diagram of an embodiment of a computer system or cloud server in which the present invention may be implemented.

FIG. 7 depicts a block diagram of components of the computing system 600 of FIG. 6, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Computing system 600 can include one or more processors 702, one or more computer-readable RAMs 704, one or more computer-readable ROMs 706, one or more computer readable storage media 708, device drivers 712, read/write drive or interface 714, and network adapter or interface 716, all interconnected over a communications fabric 718. Communications fabric 718 can be implemented with any architecture designed for passing data and/or control information between processors (such as microprocessors, communications and network processors, etc.), system memory, peripheral devices, and any other hardware components within the system.

One or more operating systems 710, and application programs 711, such as a storage system data recovery component 150 are stored on one or more of the computer readable storage media 708 for execution by one or more of the processors 702 via one or more of the respective RAMs 704 (which typically include cache memory). In the illustrated embodiment, each of the computer readable storage media 708 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing system 600 can also include a R/W drive or interface 714 to read from and write to one or more portable computer readable storage media 726. Application programs 711 on computing system 600 can be stored on one or more of the portable computer readable storage media 726, read via the respective R/W drive or interface 714 and loaded into the respective computer readable storage media 708.

Computing system 600 can also include a network adapter or interface 716, such as a TCP/IP adapter card or wireless communication adapter. Application programs 711 on computing system 600 can be downloaded to the computing device from an external computer or external storage device via a network (for example, the Internet, a local area network or other wide area networks or wireless networks) and network adapter or interface 716. From the network adapter or interface 716, the programs may be loaded into the computer readable storage media 708. The network may comprise copper wires, optical fibers, wireless transmission, routers, firewalls, switches, gateway computers and edge servers.

Computing system 600 can also include a display screen 720, a keyboard or keypad 722, and a computer mouse or touchpad 724. Device drivers 712 interface to display screen 720 for imaging, to keyboard or keypad 722, to computer mouse or touchpad 724, and/or to display screen 720 for pressure sensing of alphanumeric character entry and user selections. The device drivers 712, R/W drive or interface 714, and network adapter or interface 716 can comprise hardware and software stored in computer readable storage media 708 and/or ROM 706.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
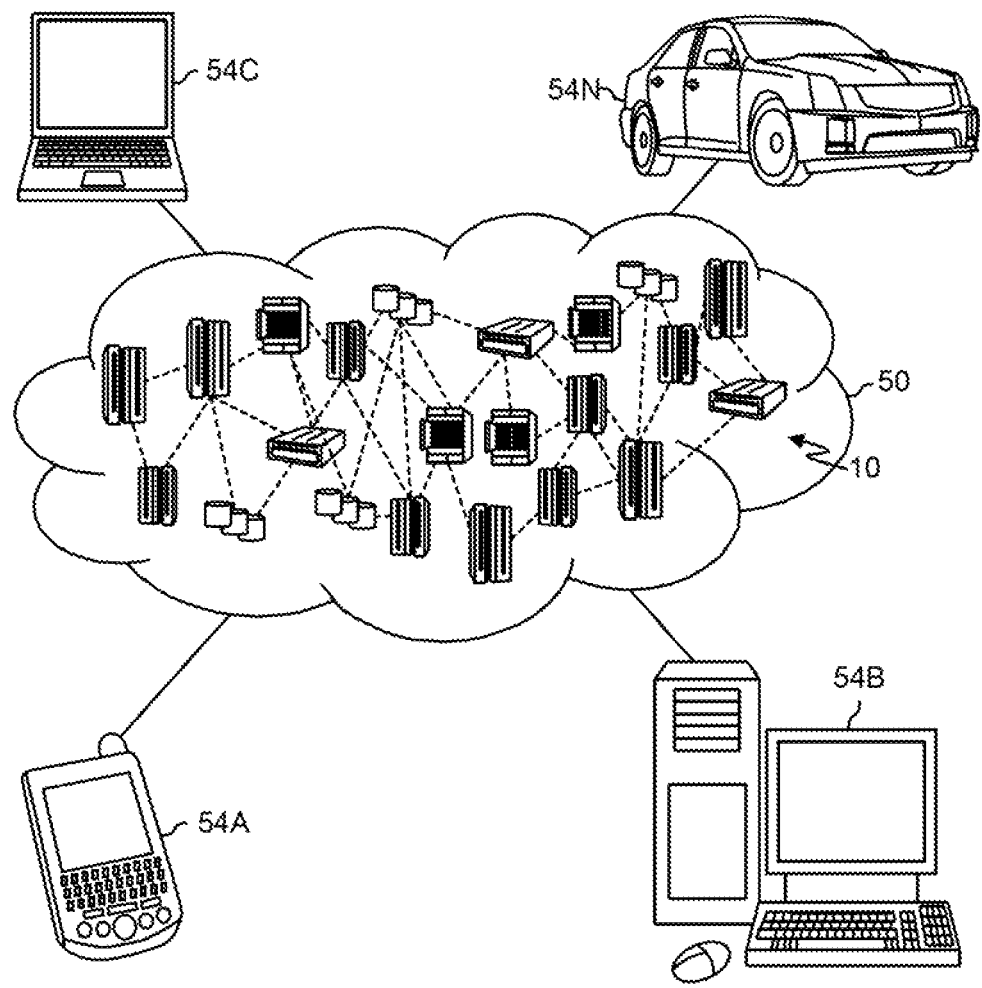
FIG. 8 is a schematic diagram of a cloud computing environment in which the present invention may be implemented.
Figure 9:
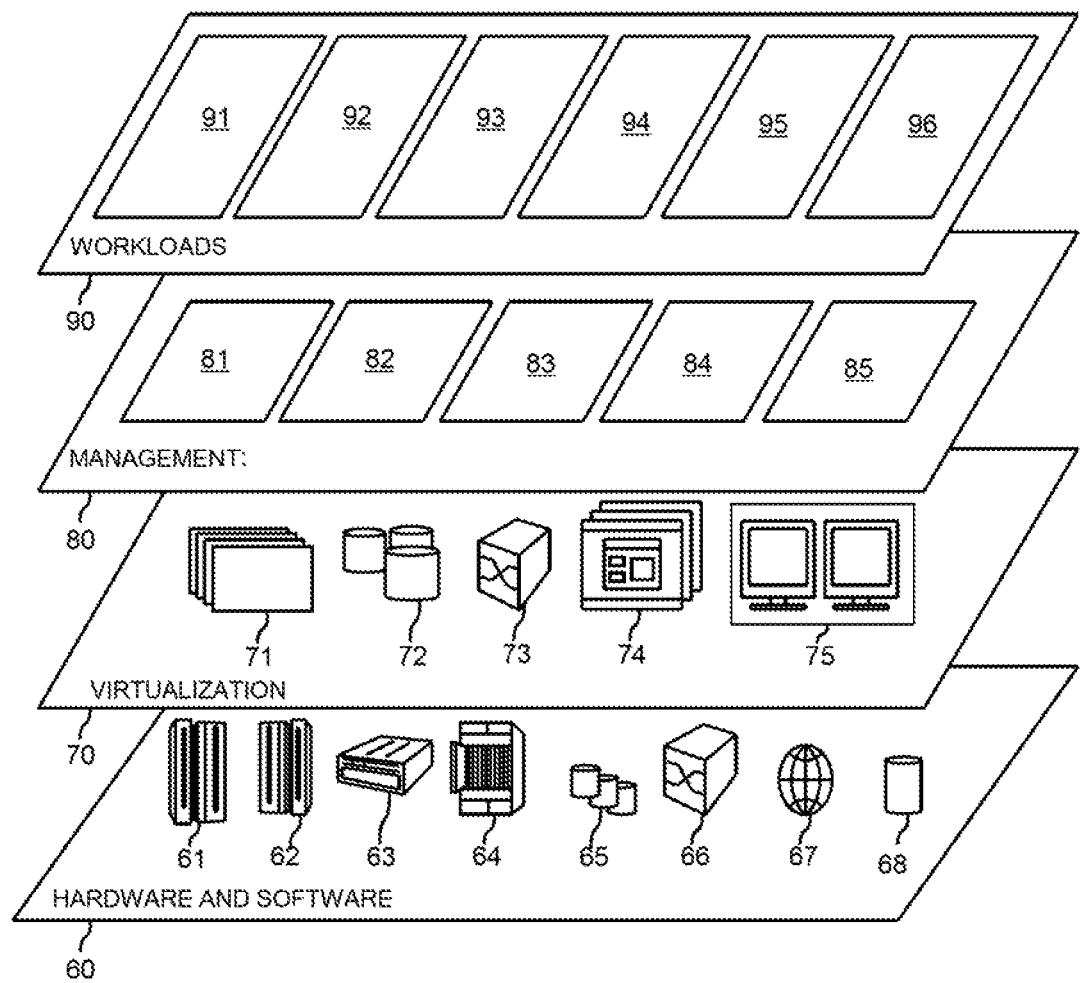
FIG. 9 is a diagram of abstraction model layers of a cloud computing environment in which the present invention may be implemented.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storage system processing 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for data validation during data recovery in a log-structure array (LSA) storage system, comprising:
reading a log record of a recovery log for a logical address to obtain a physical address at a storage backend for data of the logical address at the time of the log record;
reading reference metadata at the obtained physical address, wherein the reference metadata indicates the logical address that last wrote data to the physical address;
validating that the physical address for the log record contains valid data for the logical address of the log record by comparing the logical address of the reference metadata to the logical address of the log record; and
in response to a determination that the physical address is validated for recovery of virtual domain logical metadata, replaying the log record and mapping the logical address to the physical address of the log record,
wherein counters are maintained at the logical metadata of the virtual domain and of the log records, and wherein a counter of a log record being read is compared with a current counter of the logical metadata for the logical address such that log records with a greater counter than the current counter of the logical metadata are replayed to update the logical metadata.

2. The method as claimed in claim 1, further comprising:
in response to a determination that the physical address is not validated, replaying information in the log record that does not relate to the physical address.

3. The method as claimed in claim 1, further comprising:
reading the virtual domain logical metadata to determine whether the log record is later than a current logical metadata for the logical address, wherein earlier log records are not replayed.

4. The method as claimed in claim 1, further comprising:
iterating readings of log records in a recovery log including reading multiple log records for the logical address, wherein replaying all the log records in the recovery log results in recovery of the virtual domain logical metadata and mapping of the logical address to a most recent valid physical address.

5. The method as claimed in claim 1, wherein the metadata reference at the physical address is updated during input and output operations of the storage system indicating the logical address that last wrote to the physical address.

6. The method as claimed in claim 5, further comprising, during a write of data to a logical address:
adding reference metadata to host data of the write to indicate the logical address writing the data;
writing the data including the reference metadata to the physical address;
updating logical metadata of the virtual domain for the logical address with the physical address at which the data is written; and
adding a new log record to a recovery log of the updated logical metadata.

7. The method as claimed in claim 1, further comprising:
updating the counter of the logical metadata when the replayed log record does not contain a valid physical address for the logical address to indicate that this information is missing.

8. The method as claimed in claim 7, further comprising:
determining that log records are missing in response to a determination that the log record counter that is being replayed is a count of one or more greater than the current counter of the logical metadata.

9. The method as claimed in claim 1, wherein the virtual domain logical metadata uses B-tree data structures to record the mapping of logical addresses to physical addresses and the log records contain information relating to a copy of a B-tree for restoring the B-tree of the logical metadata.

10. The method as claimed in claim 9, wherein the recovery log is a cyclic log and indicates where a copy was started in the recovery log for replaying of all the history of the B-tree.

11. A system for data validation during data recovery in a log-structure array (LSA) storage system, comprising:
 a processor and a memory configured to provide computer program instructions to the processor to execute the function of the components:
 a log record reading component for reading a log record of a recovery log for a logical address to obtain a physical address at a storage backend for data of the logical address at the time of the log record;
 a reference metadata reading component for reading reference metadata at the obtained physical address, wherein the reference metadata indicates the logical address that last wrote data to the physical address;
 a physical address validating component for validating that the physical address for the log record contains valid data for the logical address of the log record by comparing the logical address of the reference metadata to the logical address of the log record;
 a log record replaying component for replaying the log record and mapping the logical address to the physical addresses of the log record in response to a determination that the physical address is validated for recovery of virtual domain logical metadata;
 a counting component for maintaining counters at the logical metadata of the virtual domain; and
 a log counting component for maintaining counters of the log records and the counting component, wherein a counter of a log record being read is compared with a current counter of the logical metadata for the logical address such that log records with a greater counter than the current counter of the logical metadata are replayed to update the logical metadata.

12. The system as claimed in claim 11, wherein the log record replaying component includes an additional information replaying component for replaying information in the log record that does not relate to the physical address in response to a determination that the physical address is not validated.

13. The system as claimed in claim 11, further comprising:
 a logical metadata reading component for reading the virtual domain logical metadata to determine whether the log record is later than a current logical metadata for the logical address, wherein earlier log records are not replayed.

14. The system as claimed in claim 11, further comprising:
 an iterating component for iterating readings of log records in a recovery log including reading multiple log records for the logical address and wherein replaying all the log records in the recovery log results in recovery of the virtual domain logical metadata includes and mapping of the logical address to the most recent valid physical address.

15. The system as claimed in claim 11, further comprising:
 a metadata reference component for updating the metadata reference at the physical address during input and output operations of the storage system indicating the logical address that last wrote to the physical address.

16. The system as claimed in claim 11, wherein the metadata reference component adds reference metadata to host data of the write to indicate the logical address writing the data, and further comprises:
 a data write component that writes the data including the reference metadata to a physical address;
 a logical metadata component that updates logical metadata of the virtual domain for the logical address with the physical address at which the data is written; and
 a recovery log component that adds a new log record to a recovery log of the updated logical metadata.

17. The system as claimed in claim 11, further comprising:
 updating the counter of the logical metadata when the replayed log record does not contain a valid physical address for the logical address to indicate that this information is missing.

18. The system as claimed in claim 17, further comprising:
 a missing record component for determining that log records are missing in response to a determination that the log record counter that is being replayed is a count of one or more greater than the current counter of the logical metadata.

19. The system as claimed in claim 11, wherein the virtual domain logical metadata uses B-tree data structures to record the mapping of logical addresses to physical addresses and the log records contain information relating to a copy of a B-tree for restoring the B-tree of the logical metadata.

20. The system as claimed in claim 19, wherein the recovery log is a cyclic log and indicates where a copy was started in the recovery log for replaying all the history of the B-tree.

* * * * *